Patented May 12, 1942

2,282,518

UNITED STATES PATENT OFFICE 2,282,518

PREPARATION OF PHENOL-LIGNIN-ALDEHYDE RESINS

Carroll A. Hochwalt, Dayton, and Mark Plunguian, Chillicothe, Ohio, assignors to The Mead Corporation, Chillicothe, Ohio, a corporation of Ohio No Drawing. Original application April 9, 1936, Serial No. 73,517. Divided and this application June 3, 1939, Serial No. 277,320

3 Claims. (Cl. 260—53)

This invention relates to the production and use of resinous materials in molding.

It is a principal object of the invention to provide an inexpensive resinous material containing lignin and having the properties of being quickly and easily molded, the molded products possessing high strength, being very hard, and having substantial resistance to solvents and the like.

It is a further object to provide as a new product for molding purposes a condensation product of lignin which has good strength, water resistance, appearance, etc., and which can be readily molded with filler material to produce molded products.

It is a further object to provide a condensation product of lignin for use in molding having the property to cure quickly during the molding operation.

It is a further object to provide a simple and effective method for making such lignin products.

Other objects will be apparent from the description and the appended claims.

This application is a division of co-pending application Ser. No. 73,517, filed April 9, 1936 Patent No. 2,168,160.

The present invention relates to and is part of a recent development in the field of production and utilization of lignin material, for use in the field of molding. Lignin material is obtained from woody fibrous material and comprises the principal non-cellulosic constituent of the original wood. It may be segregated in different ways, and is conveniently recovered in commercial operations from the spent digestion liquor resulting from the chemical cooking treatment of wood in the making of paper. Different chemical processes are used, both acid and alkaline cooks, but for the practicing of the present invention it is preferred to use the spent digestion or black liquor resulting from the alkaline soda or sulfate processes. Such spent liquor is available in large quantities and the lignin can be recovered therefrom quite inexpensively so that such liquor constitutes a preferred source for obtaining a low cost lignin material suitable for use in this invention. A preferred method of recovery of lignin material from spent digestion liquor of this character is described in application of Herman J. Reboulet Serial No. 734,425, filed July 9, 1934, and in the joint application of Carroll A. Hochwalt and Richard C. Camp Serial No. 46,777, filed October 25, 1935, both assigned to the same assignee as this application. In that process a black liquor is subjected to a controlled carbonation by passing $CO_2$ containing gas therethrough until a predetermined pH value of approximately $pH_8$ to $pH_9$ is obtained following which the suspension is brought to a temperature of about 50 to 70° C. to cause coagulation and agglomeration of the precipitated particles and to facilitate filtering. The suspension is then cooled to substantially room temperature and filtered, the filtrate being returned to the recovery system, and the precipitate comprising the desired separated fraction containing the lignin solids is washed with water and then treated with sufficient strong acid such as sulfuric acid to effect neutralization and removal of any remaining sodium organic compounds. It is then given a final wash with water to remove any remaining acid. A lignin material obtained in this manner from an alkaline liquor is substantially free of alkaline solvents such as caustic solution, is of such character that it is adapted to be readily molded with fillers, is low in ash, and has a relatively low melting point of not more than approximately 180° C. to 200° C. such that it can be readily fluxed on hot milling rolls, forming a blanket on the rolls when mixed with fillers and with other resinous substances.

In accordance with the present invention lignin material having these characteristics is caused to undergo a condensation reaction preparatory to the preparation of a resinous material for use in molding. This is effected by bringing the lignin into contact with those materials, and under the conditions favorable to the progress of a condensation reaction. This may be done by heating the lignin in the presence of a phenolic body such as phenol, cresol, cresylic acid, tar acid, or the like and with or without the presence of aldehydic material such as formaldehyde, paraformaldehyde, furfural, hexamethylenetetramine, or the like. This reaction is carried out under suitable conditions such as in an open dish and heated on a steam bath. These is further preferably used a catalytic agent adapted to facilitate the condensation reaction which may be either an acid material or an alkali. Satisfactory results have been secured using caustic soda, and using hydrochloric acid, but other well known catalysts as used in the conventional phenol formaldehyde reaction may be used.

In order to facilitate the condensation of the lignin, the reaction is carried out with the lignin and other ingredients in intimate contact with each other. For this purpose the lignin is first preferably dissolved in phenol or in the other phenolic body. This may be accomplished by heating the lignin on a steam bath in the presence of the phenol in an open casserole or dish and stirring. It is found that in this way the lignin may be brought into solution in the phenol quite readily. Air dried lignin may be dissolved in the phenol, or if desired the step of drying of the lignin may be eliminated and it may be mixed with the phenol in its wet condition as originally obtained. For example satisfactory results have been secured by mixing the lignin as obtained in accordance with the processes described above with phenol, the lignin containing approximately 80% by weight of water.

The lignin solution in phenol is then mixed with the aldehydic body; this may be conveniently accomplished by adding formaldehyde solution to the lignin solution and stirring the two solutions to thoroughly mix the same together. By first dissolving the lignin in the phenol, and thereafter effecting a mixture of the aldehyde solution with the solution of lignin, a very thorough and complete intermixture is assured of the lignin with both the phenolic and aldehyde bodies so that a condensation of the lignin itself is facilitated and more uniform results secured thereby.

The heating is then continued with frequent stirring of the mixture until the reaction has advanced sufficiently for the purpose desired. It is found that as the reaction is continued the mass begins to show evidences of solidifying, and the reaction should be stopped by discontinuing the heating at the point which will produce a condensation product having the desired plastic characteristics.

The following has been developed as a convenient method of determining how far the reaction should be allowed to proceed in order to get a resinous product suitable for use in subsequent molding operations with a fibrous or other filler material. As the mass solidifies it is tested with a weight of predetermined mass and having a predetermined surface area, and the reaction is continued until the mass will just support such a weight upon its surface. As an illustration of such a test which has been found to give satisfactory results, a 25 gram weight having a diameter of 22 mm. has been used in the manner described above. Is will be understood however that this is given as illustrative only.

When the resin is removed from the heating bath at this stage and cooled, is is found to be a tough dark brittle solid which can be readily powdered and used in subsequent molding operations. When mixed with fibrous or other filler material over a wide range of relative proportions this resin was found to produce very satisfactory molded products. It can be used in the conventional molding process steps and with the customary apparatus, and will give good results as to length of cure required in the production of molded articles. As a specific example, the above resinous material was mixed dry with an equal quantity by weight of fibrous filler and the mixture then passed between the nip of a pair of smooth rolls heated to a temperature of about 230° F. As the resin binder materials fluxed a blanket was formed about the rolls, the blanket being doctored off and the sheet repassed through the mill as required to produce the desired degree of preliminary setting up of the resins, and the uniform envelopment and impregnation by the resins of the particles of filler. The resulting sheet was then broken and ground up to fine powder form to provide the molding powder. This powder was then placed in the mold and molded at a temperature of 330° F. and a pressure of 2500 pounds per square inch. After a curing time of 60 seconds the reaction was complete and the mold released, with the production of a strong hard-surfaced, dense and well-cured article. The time of cure is a factor of economic importance in commercial operations and it is highly desirable to obtain as short a curing time as possible. And in accordance with the present invention very limited curing times are required, in some instances being materially less than that indicated above.

In the practicing of the invention on a commercial or plant scale it is preferred to substitute for the open dish an autoclave of usual character within which the material may be subjected to controlled pressure above or below atmospheric during the reaction process. Also mechanical stirring mechanism is provided and samples may be taken periodically to test and determine the extent of the reaction.

The proportions of the materials as used in the condensation reaction may be varied over a considerable range in accordance with the characteristics of the product desired. As an example, lignin may be used with substantially equal quantities of phenol and formaldehyde. In one operation good results were secured utilizing 25 parts of lignin material, 25 parts of phenol, and 34 parts of a 40% formaldehyde solution. The proportion of aldehyde may be varied and satisfactory results have been obtained using quantities of formaldehyde varying from 17 parts in the above formula to 50 parts. Similarly the proportion of lignin and phenol may be varied as desired, it usually being desirable to use as large a quantity of lignin as possible because of its cheaper cost than phenol.

The present process is further characterized by very satisfactory yields, making the practicing of the invention highly economical. For example in the composition described above using 25 parts of lignin, 25 parts of phenol and 34 parts of 40% formaldehyde, including 2 parts sodium hydroxide, a yield of approximately 64.5 parts of resinous molding material was obtained. Similarly using the same ingredients with an increase in the quantity of formaldehyde to 50 parts, a yield of about 71 parts, very close to the maximum theoretical yield was obtained.

The catalyst used to further the condensation reaction may be either an acid or an alkaline material, although better results in the utilization of lignin obtained by the process of the above referred to copending application have been secured by the use of an alkaline catalyst. For example in the composition just described two parts of sodium hydroxide were used; alternately one part of an acid such as hydrochloric acid can be used. The catalyst is added to the other ingredients and is present during the heating on the steam bath.

It has been found by applicants that the lignin as found in the spent digestion liquor from the acid or sulfite process, when used as such, does not give satisfactory molding products. Where it is attempted to use the solids of waste sulfite liquor, either as merely the dried residue of the digestion liquor, or as a purified lignin derivative thereof, the resulting product was found to be unsatisfactory. Where a condensation reaction was carried out including such lignin material and phenolic and aldehydic bodies, and the reaction was allowed to proceed so far that the resulting resin became brittle upon cooling, it was too stiff for hot milling. Where the reaction was terminated before progressing this far, the resulting resin was soft at room temperatures but did not exhibit satisfactory molding properties. It became stiff quite rapidly when mixed with the filler and subjected to hot milling and the resulting molding compound was too stiff to mold after hot-milling.

It has been found that lignin as obtained from the sulfite waste liquor may however be subjected to such controlled processing as to free it of the objectionable sulfonic acid radicals and convert it into a form capable of producing results comparable with those secured with a lignin obtained from black liquor. This has been accomplished by digesting the non-alkaline lignins (such as the sulfite) with caustic soda, and lignin material having satisfactory characteristics as to condensation and formation of moldable powders etc. has been obtained from sulfite lignin in this way.

In such processing the sulfite liquor, preferably concentrated to approximately 50% is treated with caustic soda and subjected to elevated temperature and preferably to pressures above atmospheric. Thus when treated with 15.7% NaOH at atmospheric pressure and at a temperature of 105° C., a yield of lignin product amounting to approximately 12% by weight of the concentrated liquor was obtained, the lignin having a melting point and other characteristics comparable with those found in lignin from the alkaline processes.

As another example, the concentrated liquor was treated with 7.2% NaOH at a temperature of 235° C. and a pressure of 420 lbs. per sq. in. This resulted in a higher yield of the order of 25% of the concentrated liquor, of lignin material of generally similar characteristics.

When a sulfite lignin from which the carbohydrates had been removed (known commercially as Maratan extract) was digested with 6.8% NaOH at 245° C. and 525 lbs. per sq. in., a very satisfactory lignin material was obtained having a melting point of the order of 90° C., and capable of being readily molded similarly to the molding of a lignin originally secured by an entirely different process.

In each of these cases the altered lignin material was found to be moldable with fillers and the like, soluble in phenols and capable of undergoing a condensation reaction in the presence of phenolic and aldehydic bodies in a manner similar to that described above.

It will be apparent therefore that the present case provides a thermosetting resinous product having especially good properties of water resistance, appearance, and strength when molded with the usual fillers. It is available inexpensively, and can be utilized in accordance with the present practice in the molding field, since it does not require the existence of unusual conditions during the molding operation. And the molding cycle including the time of cure of the molded article is sufficiently short to be comparable with the practice in this art. Also the method herein described for obtaining this product is extremely simple and can be readily carried out with different specific ingredients to obtain molding products as described.

While the process and product herein described constitute preferred embodiments of the invention, it is to be understood that the invention is not limited to this precise process and product, and that changes may be made therein without departing from the scope of the invention which is defined in the appended claims.

What is claimed is:

1. The method of preparing a water-resistant thermosetting resinous material for use in molding which comprises recovering lignin solids from black liquor of alkaline reaction in a condition substantially free of alkaline solvents and sodium organic compounds and subjecting such lignin solids as thus recovered and following separation from alkaline solution to a condensation reaction by heating said lignin solids in the presence of a phenolic body and an aldehydic material to provide a potentially reactive thermosetting resinous material.

2. The method of forming a potentially reactive water-resistant thermosetting resinous material of the character described which comprises separating lignin solids from black liquor to provide said lignin material in a form substantially free of alkaline solvents and sodium organic compounds, dissolving said lignin solids as thus separated in a phenolic body, and reacting said solution with an aldehydic material under heat in the presence of a catalyst adapted to promote a condensation reaction.

3. The method of forming a potentially reactive water-resistant thermosetting resinous material of the character described which comprises recovering lignin material from black liquor of alkaline reaction and separating such lignin material from alkaline solvents to provide separated lignin solids substantially free of alkaline solvents and sodium organic compounds, dissolving such lignin solids as thus separated in a phenolic body, and reacting said solution with an aldehydic material under heat in the presence of a small quantity of a catalyst adapted to promote a condensation reaction.

CARROLL A. HOCHWALT.
MARK PLUNGUIAN.